United States Patent
Ross et al.

(10) Patent No.: US 11,294,706 B1
(45) Date of Patent: Apr. 5, 2022

(54) MULTI-ROLE SECURE DIGITAL PROCESSING

(71) Applicant: Rockwell Collins, Inc., Cedar Rapids, IA (US)

(72) Inventors: Jodee Mae Ross, Cedar Rapids, IA (US); Angelo Joseph Ruggeri, Cedar Rapids, IA (US); Adriane R. Van Auken, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 359 days.

(21) Appl. No.: 16/697,729

(22) Filed: Nov. 27, 2019

(51) Int. Cl.
*G06F 21/57* (2013.01)
*G06F 9/455* (2018.01)

(52) U.S. Cl.
CPC .......... *G06F 9/45558* (2013.01); *G06F 21/57* (2013.01); *G06F 2009/45562* (2013.01); *G06F 2009/45587* (2013.01)

(58) Field of Classification Search
CPC ................. G06F 9/45558; G06F 21/57; G06F 2009/45562; G06F 2009/45587
USPC ........................................................ 713/164
See application file for complete search history.

(56) References Cited

U.S. PATENT DOCUMENTS

| | | | | |
|---|---|---|---|---|
| 6,754,819 B1* | 6/2004 | Wootten | .............. | G06F 21/6209 713/150 |
| 2004/0052372 A1* | 3/2004 | Jakoubek | ............... | H04B 1/406 380/255 |
| 2006/0141954 A1* | 6/2006 | Jones | .................... | H04B 1/406 455/103 |
| 2009/0196170 A1* | 8/2009 | Ayyagari | ................ | H04L 45/28 370/221 |
| 2012/0036581 A1* | 2/2012 | Maximilien | ............ | G06F 21/85 726/26 |
| 2014/0200749 A1* | 7/2014 | Spilsbury | ........... | H04B 7/18506 701/3 |
| 2015/0365233 A1* | 12/2015 | Kleidermacher | ..... | H04L 9/0877 380/270 |
| 2017/0078455 A1* | 3/2017 | Fisher | ..................... | H04L 69/03 |
| 2019/0176323 A1* | 6/2019 | Coady | ...................... | B60L 3/12 |

* cited by examiner

*Primary Examiner* — Michael S McNally
(74) *Attorney, Agent, or Firm* — Suiter Swantz pc llo

(57) ABSTRACT

A processing system includes a first processing circuit including a first PLC configured to receive a red signal, a plurality of first processors operated by the first PLC to process the red signal, and a first hypervisor configured to control operation of the first processors. The processing system includes a second processing circuit physically separated from the first processing circuit that includes a second PLC configured to receive a black signal, a plurality of second processors operated by the second PLC to process the black signal, and a second hypervisor configured to control operation of the second processors. The processing system includes a configuration controller configured to identify an operation to be performed by at least one of the first or second processing circuit and cause at least one of the corresponding first hypervisor or second hypervisor to allocate respective first processors or second processors to perform the operation.

20 Claims, 3 Drawing Sheets

MULTI-ROLE SECURE DIGITAL PROCESSING

BACKGROUND

The present disclosure relates generally to the field of network communications. More particularly, embodiments of the inventive concepts disclosed herein relate to systems and methods for multi-role secure digital processing.

Digital processing hardware can use physical separation to enable secure processing, such as for performing cryptographic operations. However, such approaches may result in increased size, weight, power, and cost (SWAP-C) requirements, as at least some portions of the hardware on either side of the physical separation may be underutilized relative to the overall desired functionality of the system.

SUMMARY

In one aspect, the inventive concepts disclosed herein are directed to a digital processing system. The digital processing system includes a first processing circuit including a first programmable logical controller (PLC) configured to receive a red signal, a plurality of first processors operated by the first PLC to process the red signal, and a first hypervisor configured to control operation of the plurality of first processors. The digital processing system includes a second processing circuit physically separated from the first processing circuit. The second processing circuit includes a second PLC configured to receive a black signal, a plurality of second processors operated by the second PLC to process the black signal, and a second hypervisor configured to control operation of the plurality of second processors. The digital processing system includes a configuration controller configured to identify an operation to be performed by at least one of the first processing circuit or the second processing circuit and cause at least one of the corresponding first hypervisor or second hypervisor to allocate one or more respective first processors or second processors to perform the operation.

In a further aspect, the inventive concepts disclosed herein are directed to a method. The method includes receiving, by a first programmable logical controller (PLC) of a first processing circuit, a red signal, receiving, by a second PLC of a second processing circuit physically separated from the first processing circuit, a black signal, identifying, by a configuration controller, an operation to be performed by at least one of the first processing circuit or the second processing circuit, and causing, by the configuration controller, at least one of a first hypervisor that controls operation of a plurality of first processors of the first processing circuit or a second hypervisor that controls operation of a plurality of second processors of the second processing circuit to allocate one or more respective first processors or second processors to perform the operation.

In a further aspect, the inventive concepts disclosed herein are directed to a configuration controller for a digital processing system. The digital processing system includes a first programmable logical controller (PLC) configured to receive a red signal, first processors operated by the first PLC to process the red signal, a first hypervisor configured to control operation of the first processors, a second PLC configured to receive a black signal, second processors operated by the second PLC to process the black signal, and a second hypervisor configured to control operation of the second processors. The configuration controller includes instructions stored in a memory. The instructions are used to identify an operation to be performed by at least one of the first processing circuit or the second processing circuit and cause at least one of the corresponding first hypervisor or second hypervisor to allocate one or more respective first processors or second processors to perform the operation

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
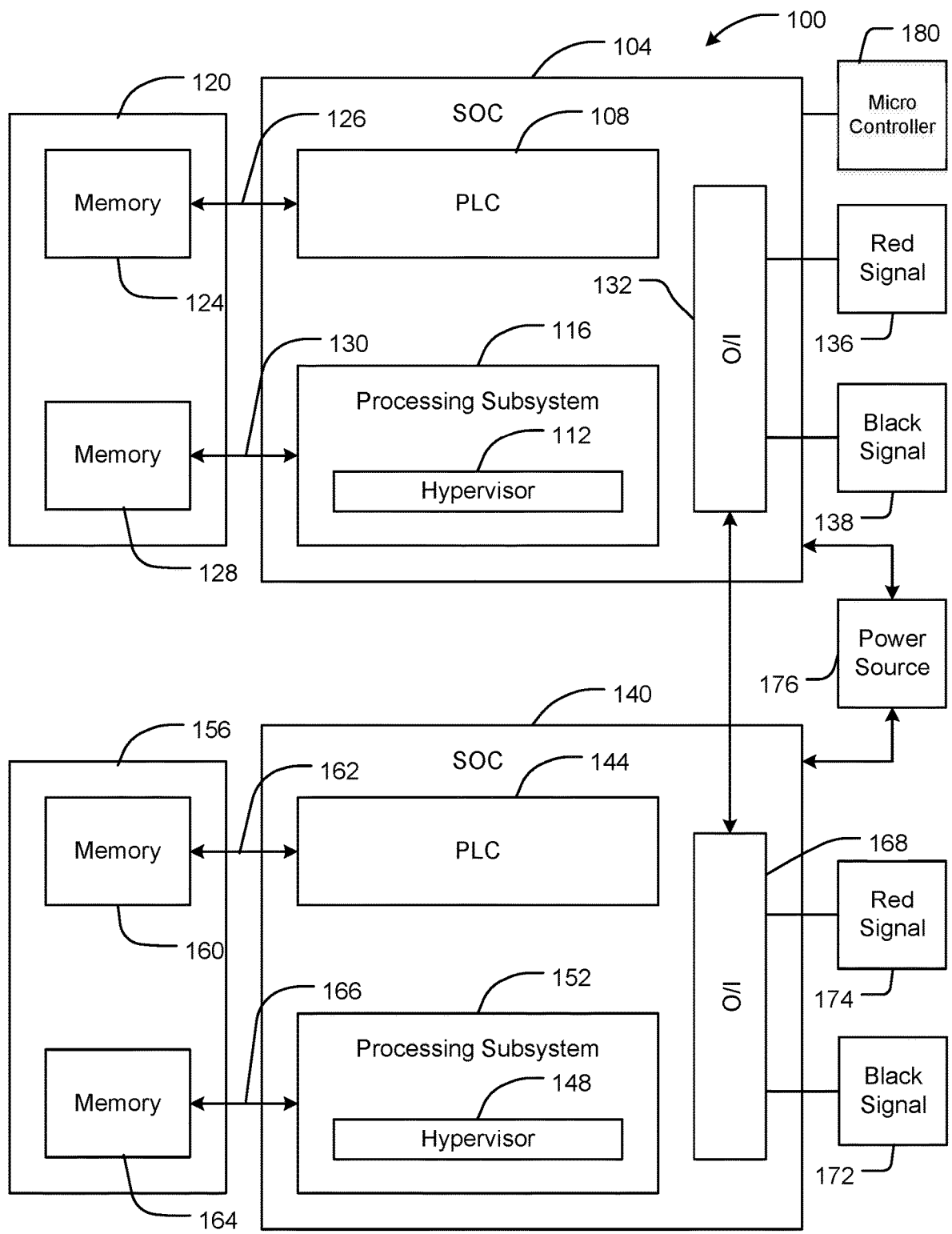
FIG. 1 is a block diagram of an exemplary embodiment of a digital processing system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for multi-role secure digital processing. In some embodiments, a digital processing system includes a first processing circuit including a first programmable logical controller (PLC) configured to receive a red signal, a plurality of first processors operated by the first PLC to process the red signal, and a first hypervisor configured to control operation of the plurality of first processors. The digital processing system includes a second processing circuit physically separated from the first processing circuit. The second processing circuit includes a second PLC configured to receive a black signal, a plurality of second processors operated by the second PLC to process the black signal, and a second hypervisor configured to control operation of the plurality of second processors. The digital processing system includes a configuration controller configured to identify an operation to be performed by at least one of the first processing circuit or the second processing circuit and cause at least one of the corresponding first hypervisor or second hypervisor to allocate one or more respective first processors or second processors to perform the operation.

Systems and methods in accordance with the inventive concepts disclosed herein can improve the operation of digital processing systems by providing physical and virtual separation between processors or groups of processors of the first and second processing circuit, while enabling dynamic configuration of how processors are used to perform certain operations based on factors such as the type of operation to be performed or a mode in which the processors are to operate. As such, the inventive concepts disclosed herein can enable multi-role secure digital processing in which multiple levels of security can be implemented in the digital processing system while reducing the size of the hardware needed to perform such operations, including performing operations at different levels of security simultaneously.

The inventive concepts disclosed herein can be utilized in a number of digital processing systems, cryptographic systems, and communication systems, including radio hardware on airborne platforms. The inventive concepts disclosed herein can be used to enable improved communications amongst various types of electronic avionics applications for ground-based platforms and airborne platforms (e.g., aircraft), including but not limited to flight control and autopilot systems, navigation systems, flight display systems, communications systems, radar systems, electric power systems, engine control systems, and monitor warning systems. The inventive concepts disclosed herein can be used to enable improved secure data processing, such as for cryptographic functions. For example, reconfigurable systems, including cryptographic systems, as described herein can provide connectivity for tactical and operational platforms and can support multiple levels of sensitive and classified data simultaneously while ensuring separation and confidentiality for each domain as required by data owners. Reconfigurable systems can simultaneously host and protect a wide range of data, for example, from unclassified maintenance and system health data to highly sensitive mission, tactical, and/or intelligence data.

Referring now to FIG. 1, an embodiment of a digital processing system 100 according to the inventive concepts disclosed herein includes a first processing circuit 104 and a second processing circuit 140. The processing circuits 104, 140 can be implemented using a system on a chip (SoC). The SoC can be an integrated circuit that integrates components such as a central processing unit (CPU), memory, input/output ports, and secondary storage on a same circuit board.

The first processing circuit 104 includes a first programmable logic controller (PLC) 108. The first PLC 108 can control operation of various components of the first processing circuit 104, such as to use processing subsystem 116 to perform electronic operations based on instructions from memory 124. In some embodiments, the first PLC 108 is implemented using a field programmable gate array (FPGA). The FPGA can include a plurality of configurable logic blocks that are connected via programmable interconnects. In some embodiments, the FPGA can perform partial reconfiguration. As such, the FPGA can be reconfigured to be reprogrammed to perform desired operations or functions.

The first processing circuit 104 can include a first processing subsystem 116. The first processing subsystem 116 can include one or more processors (e.g., processing cores). As described below with reference to FIG. 2, the one or more processors can each be independently assigned operations to perform by the first PLC 108 or the first hypervisor 112.

The first processing subsystem 116 can include or be coupled with a first hypervisor 112. The first hypervisor 112 can selectively allocate processing resources (e.g., portions of processing subsystem 116) to be used to perform operations according to instructions from the PLC 108. The first hypervisor 112 can include software, firmware, hardware, or any combination thereof. The first hypervisor 112 can selectively allocate processing resources that separately operate as virtual machines (e.g., even if executing on the same chip). In some embodiments, the first hypervisor 112 is executed by an operating system (e.g., host operating system) of the first PLC 108, and the first hypervisor 112 can execute operating systems (e.g., guest operating systems) using processing subsystem 116.

The first processing circuit 104 can communicate with a first memory device 120. The first memory device 120 can be implemented on the same circuit board as the first processing circuit 104. The first memory device 120 can include one or more devices (e.g., RAM, ROM, flash memory, hard disk storage) for storing data and computer code for completing and facilitating the various user or client processes, layers, and modules described in the present disclosure. The first memory device 120 may be or include volatile memory or non-volatile memory and may include database components, object code components, script components, or any other type of information structure for supporting the various activities and information structures of the inventive concepts disclosed herein. The first memory device 120 can be communicably connected to the first PLC 108 and first processing subsystem 116 and includes computer code or instruction modules for executing one or more processes described herein. The first memory device 120 can include various circuits, software engines, and/or modules that cause the first PLC 108 or first processing subsystem 116 to execute the systems and methods described herein.

In some embodiments, the first memory device 120 includes a plurality of memory units 124, 128. For example, the first memory device 120 can include a plurality of first memory units 124 (e.g., RAM units) that can be used by the first processing subsystem 116, and a plurality of second memory units 128 (e.g., RAM units) that can be used by the first PLC 108. The first memory device 120 or components thereof may be battery-backed or non-battery-backed.

The first memory units 124 can be separate from the second memory units 128. For example, the first memory units 124 can be coupled with the first processing subsystem 116 using a first bus 126, while the second memory units 128 are coupled with the first PLC 108 using a second bus 130 physically separate from the first bus 126. In some embodiments, each memory unit 124, 128 is a double data rate RAM unit, such as a DDR4 RAM chip. As such, the functions performed by the first PLC 108 and first processing subsystem 116 may each be performed using separate memory components of the first memory device 120.

The first processing circuit 104 can include one or more communications interfaces 132. The communications interface 132 can operate as an input/output interface. The communications interface 132 can include one or more wired connection interfaces. For example, the communications interface 132 can include Ethernet interfaces, such as high speed Ethernet interfaces. The communications interface 132 can include or be coupled with a human machine interface (HMI), such as to receive user-generated data traffic. The communications interface 132 can be configured to transmit and receive data from an analog-to-digital converter (ADC) or digital-to-analog converter (DAC), such as for performing operations on signals corresponding to radio waveforms.

As illustrated in FIG. 1, the communications interface 132 can receive a red signal 136 from a red side of the digital processing system 100. The red signal 136 can be used to communicate sensitive data, such as classified or secret level data, which may be in a plaintext format (e.g., unencrypted). As described further herein, the separation of the first processing circuit 104 from the second processing circuit 140 can facilitate protecting processing of the red signal 136 on the red side of the digital processing system 100 from processing of black signal 172 (e.g., encrypted signal) on a black side of the digital processing system 100. In some embodiments, the communications interface 132 can also receive a black signal 138, which may be processed separately (e.g., using separate cores of the processing subsystem 116 via operation of the hypervisor 112) from the red signal 136.

The second processing circuit 140 can be similar to the first processing circuit 104, such as by including similar or identical processing hardware, firmware, and/or software as the first processing circuit 104. As illustrated in FIG. 1, the second processing circuit 140 can include a second PLC 144 that can control operation of various components of the second processing circuit 140, and can be implemented by an FPGA. The second processing circuit 140 can include a second processing subsystem 152, which can be similar to the first processing subsystem 116. The second processing subsystem 152 can include or be coupled with a second hypervisor 148, which, similar to the first hypervisor 112, can facilitate processing resource allocation, such as to operate virtual machines using processing subsystem 152 and second memory device 156.

The second memory device 156 can be similar to the first memory device 120, and can include a plurality of memory units 160, 164. For example, the second memory device 156 can include a plurality of third memory units 160 that can be used by the second processing subsystem 152 and a plurality of fourth memory units 164 that can be used by the second PLC 144, which may communicate over respective separated memory busses 162, 166.

The second processing circuit 140 can include one or more communications interfaces 168, which can be similar to the one or more communications interfaces 132. As illustrated in FIG. 1, the communications interface 168 can receive a black signal 172 from a black side of the digital processing system 100. The black signal can be used to communicate encrypted data, such as ciphertext data. In some embodiments, the communications interface 168 can also receive a red signal 174, which may be processed separately (e.g., using separate cores of the processing subsystem 116 via operation of the hypervisor 112) from the black signal 172. The hypervisors 112, 148 can provide the black signals 138, 172 to respective first cores of the processing subsystems 116, 152 to perform a first operation, and provide the red signals 136, 174 to respective second cores of processing subsystems 116, 152 separate from the first cores to perform a second operation separate from the first operation.

The system 100 can include a microcontroller 180 external to the processing circuits 104, 140. The microcontroller 180 can provide remote data or commands to be processed by the first processing circuit 104 (or the second processing circuit 140), such as data regarding cryptographic operations to be performed using the first processing circuit 104.

Figure 2:
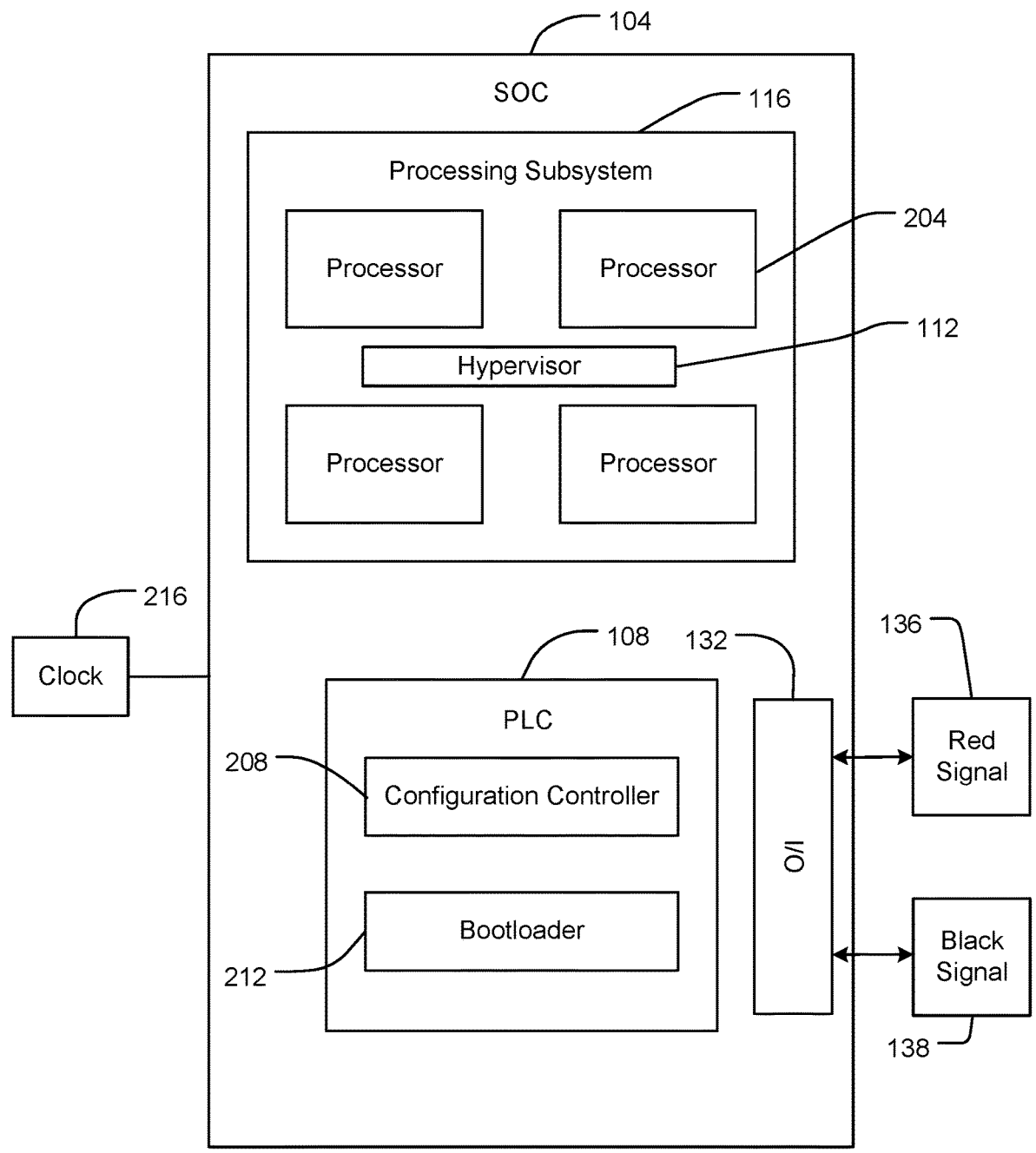
FIG. 2 is a block diagram of an exemplary embodiment of multi-role secure digital processing hardware according to the inventive concepts disclosed herein.

Referring now to FIG. 2, an embodiment of a multi-role secure digital processing system 200 according to the inventive concepts disclosed herein includes the first processing circuit 104 and various components thereof. While FIG. 2 is explained in the context of the first processing circuit 104, the second SoC 104 may also implement at least some of the components and functions described with reference to FIG. 2.

As illustrated in FIG. 2, the first processing subsystem 116 can include a plurality of processors 204. Each processor 204 can be a separate processing core, such as of a multicore processing circuit. In some embodiments, the processors 204 are ARM processors. For example, the plurality of processors 204 can include four ARM processors. The first hypervisor 112 can control operation of the processors 204, such as to assign virtual machines, functions, or operations to be performed by each processor 204 to the respective processor 204. For example, the first hypervisor 112 can assign any number of processors 204 to perform various processes (e.g., assign one processor 204 to perform a first operation and three processors 204 to perform a second operation; assign two processors 204 to perform a first operation and two processors 204 to perform a second operation; assign each processor 204 to perform different operations, etc.). In some embodiments, the first PLC 108 can use the processors 204 to operate on the red signal 136 while maintaining at least one of physical or virtual separation of the processors 204 from any operations being performed by the second processing subsystem 152.

The first PLC 108 can include a configuration controller 208. The configuration controller 208 can use the first hypervisor 112 (or vice versa) to control the operations performed by each of the processors 204 under various conditions. For example, the configuration controller 208 can control operation of the processors 204 based on a desired operation to be performed by the first processing circuit 104, a mode of operation of the first processing circuit 104, or a type of data to be processed by the first processing circuit 104.

In some embodiments, the configuration controller 208 identifies an operation to be performed (e.g., by the first processing circuit 104 or the second processing circuit 140). The configuration controller 208 can identify the operation to be performed based on the data to be used to perform the operation or the source of the data. For example, the configuration controller 208 can identify the operation to be performed based on the data being the red signal 136 or being received from a red signal source. The configuration controller 208 can identify the operation to be performed based on user input.

The configuration controller 208 can identify the operation to be performed based on an application being executed by the first processing circuit 104. For example, the configuration controller 208 can retrieve an identifier from the application, such as from metadata associated with the application or maintained by the operating system. The configuration controller 208 can retrieve the identifier from an application programming interface (API) associated with the application. The configuration controller 208 can identify the operation to be performed using a database mapping identifiers to operations to be performed. For example, the configuration controller 208 can maintain a database mapping a radio application identifier to radio operations, or a cryptographic application identifier to cryptographic operations.

The configuration controller 208 can identify the operation to be associated with any of a variety of modes of operation. For example, the modes of operation can include a modulation-demodulation (modem) operation, a control operation (e.g., generating control instructions for controlling operation of a device separate from the digital processing system 100), a cryptographic operation (e.g., encrypting or decrypting signals or the data packets thereof), or an application processing operation.

In some embodiments, the configuration controller 208 controls operation of the second processing circuit 140. For example, the configuration controller 208 can provide electronic instructions to the second processing circuit 140 or components thereof via communications interfaces 132, 168. The configuration controller 208 can cause a partial or full reconfiguration of the second processing circuit 140, enabling the first processing circuit 104 to continue operation without requiring a hard reset of the entire digital processing system 100. In some embodiments, responsive to detecting the mode of operation, the configuration controller 208 of the first processing circuit 104 causes the second processing circuit 140 to perform a partial or full reconfiguration to operate in the detected mode of operation, while maintaining operation of the first processing circuit 104 in an initial mode of operation (e.g., while the first processing circuit 104 is being used to process the red signal 136). This can enable the configuration controller 208 to more efficiently utilize the processing resources of the digital processing system 100 while maintaining separation between the first processing circuit 104 and second processing circuit 140.

In some embodiments, the configuration controller 208 controls a power usage of the first processing circuit 104 (or the second processing circuit 140). The configuration controller 208 can control the power usage based on the operation to be performed. For example, the configuration controller 208 can set the first processing circuit 104 to a standby or low power mode of operation based on the operation to be performed. The configuration controller 208 can determine an expected power usage based on the operation to be performed (e.g., by applying a function, filter, or mapping of power usage to operations) to the operation to be performed, and select the power usage (e.g., select the standby or low power mode) responsive to the expected power usage.

The configuration controller 208 can use at least one of the first hypervisor 112 or the second hypervisor 148 of the second PLC 144 to cause secret and non-secret operations to be performed separately. For example, the configuration controller 208 can identify a first operation to be performed to be a secret operation (e.g., an operation to be performed on secret plaintext), a second operation to be performed to be a non-secret operation, and cause the first hypervisor 112 to allocate separate processors 204 to perform the first operation and second operation.

The first PLC 108 can include a bootloader 212. The bootloader 212 can be controlled by the configuration controller 208. The bootloader 212 can receive software or firmware to be operated by the first PLC 108. The bootloader 212 can determine the mode of operation based on the received software or firmware, such as by processing the received software or firmware to detect an identifier of the received software or firmware, and comparing the identifier to an identifier database mapping identifiers to modes of operation. The bootloader 212 can perform initialization of the first PLC 108, such as to launch one or more operating systems of the first PLC 108. The bootloader 212 can launch one or more operating systems responsive to instructions from the configuration controller 208.

The system 200 can include a clock 216. The clock 216 can be used to set a clock speed (e.g., clock rate) at which the first processing circuit 104 or processing components thereof perform operations. For example, the configuration controller 208 can modify the clock speed of the clock 216. The processors 204 can operate according to the clock speed. In some embodiments, the configuration controller 208 assigns independent clock speeds for each of the processors 204 using the clock 216. The clock 216 may include or be associated with a clock multiplier. The clock 216 can be reconfigured responsive to reconfiguration of the first processing circuit 104 (e.g., reconfiguration of an FPGA of the first processing circuit 104) or the second processing circuit 140, which can facilitate setting the clock 216 to a mode of operation corresponding to the operation(s) to be performed by the first processing circuit 104.

The configuration controller 208 can modify the clock speed of the clock 216 based on various factors, such as priority, processing demand, or security levels of operations to be performed by the first processing circuit 104 or processors 204 thereof. For example, the configuration controller 208 can determine the clock speed based on the identified mode of operation (e.g., by retrieving from a lookup table clock speed to be selected based on the identified mode of operation). The configuration controller 208 can determine the clock speed to correspond to modes of operation such as low power, standby, or nominal operation modes. By controlling the clock speed, the configuration controller 208 can reduce power usage when the full operational capacity of the digital processing system 100 is not needed, without shutting down the first processing circuit 104 or processors 204 thereof. The clock 216 can include a first clock used for transceiver functions (e.g., to control Ethernet communication speed) and a second clock used for controlling processing speed of the first processing circuit 104 (e.g., logic-side DDR4 clock), such as for controlling power usage.

Figure 3:
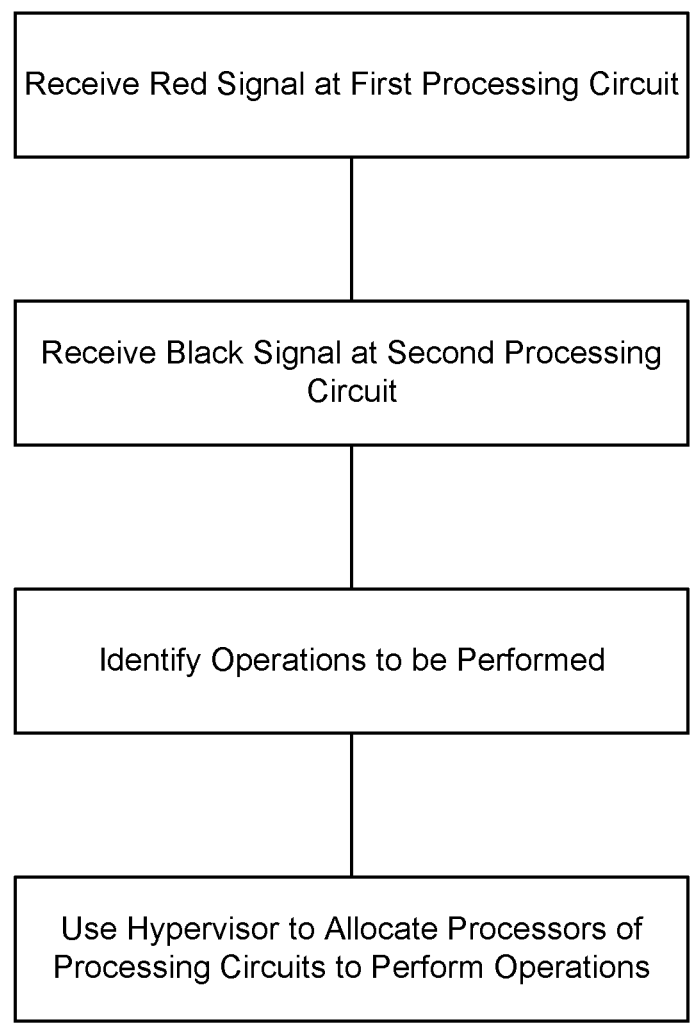
FIG. 3 is a method for multi-role secure digital processing according to the inventive concepts disclosed herein.

Referring now to FIG. 3, an embodiment of a method 300 according to the inventive concepts disclosed herein includes one or more of the following steps. The method 300 can be performed using various systems and devices described herein, including the digital processing system 100 and configuration controller 208. In some embodiments, the configuration controller 208 is a computer comprising a processor and memory as a computer readable medium that stores instructions (for the processor to execute) to perform the operations as described herein.

A step (305) may include receiving a red signal at a first processing circuit. The red signal can be received as a radio waveform. The red signal can be received periodically or continuously. The red signal can be received responsive to a request from the first processing circuit. The red signal can include sensitive data, such as classified or secret level data, which may be in a plaintext format (e.g., unencrypted).

A step (310) may include receiving a black signal at a second processing circuit. The black signal can be received as a radio waveform. The black signal can be received periodically or continuously. The red signal can be received responsive to a request from the second processing circuit. The black signal can include encrypted data, such as ciphertext data.

A step (315) may include identifying a first operation to be performed on the red signal and a second operation to be performed on the black signal. The first processing circuit can include a configuration controller that identifies the operation to be performed. For example, the configuration controller can identify the operation to be performed based on data to be used to perform the operation (e.g., data from the red signal) or the source of the data (e.g., red signal source). The operation to be performed can be identified based on user input. The operation to be performed can be identified based on an application being executed by the first processing circuit when the red signal is received, such as an application that requested the red signal. For example, an identifier of the application can be detected and used to identify the operation to be performed. The operation to be performed can include a modem operation, a control operation, a cryptographic operation, or a particular application to be executed.

The configuration controller of the first processing circuit can identify the operation to be performed on the black signal (e.g., responsive to receiving an identifier of the black signal from the second processing circuit), or a configuration controller of the second processing circuit can identify the operation to be performed on the black signal.

A step (320) may include using a hypervisor to allocate separate processors of the first processing circuit and the second processing circuit to respectively perform the first operation and the second operation. The hypervisor can include at least one of a first hypervisor of the first processing circuit or a second hypervisor of the second processing circuit. The hypervisor can selectively allocate processing resources, such as processors or virtual machines, responsive to instructions from the configuration controller. For example, the configuration controller can cause the hypervisor to allocate one or more first resources to operate in a first mode of operation (e.g., to process the red signal) and one or more second resources to operate in a second mode of operation (e.g., to process the black signal). The configuration controller can be operated by the first processing circuit and can control operation of the second processing circuit based on the identified mode of operation. The hypervisor can separately allocate first processors of the first processing circuit to perform the first operation while other first processors perform a cryptographic operation.

In some embodiments, a bootloader determines the mode of operation based on software to be operated by the second processing circuit. For example, the bootloader can determine the mode of operation based on the received software or firmware, such as by processing the received software or firmware to detect an identifier of the received software or firmware, and comparing the identifier to an identifier database mapping identifiers to modes of operation.

In some embodiments, the configuration controller controls a power usage of one or both of the first and second processing circuits. The configuration controller can control the power usage to cause one or more processors or other portions of the processing circuits to reduce power usage, such as based on the identified mode of operation. The configuration controller can use a clock to control a clock rate at which operations are performed (the rate corresponding to power usage).

As will be appreciated from the above, systems and methods for multi-role secure digital processing in accordance with the inventive concepts disclosed herein can improve operation of digital processing systems by more securely performing operations, such as cryptographic, modem, or other operations. For example, systems and methods in accordance with the inventive concepts disclosed herein can use a configuration controller to dynamically select processors to perform operations at different levels of security (e.g., secret vs. non-secret; red vs. black) while maintaining physical or virtual separation between the processors as needed, enabling the digital processing system to perform a variety of operations with reduced SWAP-C.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A digital processing system, comprising:
   a first processing circuit comprising:
   a first programmable logical controller (PLC) configured to receive a red signal;
   a plurality of first processors operated by the first PLC to process the red signal; and
   a first hypervisor configured to control operation of the plurality of first processors;

a second processing circuit physically separated from the first processing circuit, the second processing circuit comprising:
  a second PLC configured to receive a black signal;
  a plurality of second processors operated by the second PLC to process the black signal; and
  a second hypervisor configured to control operation of the plurality of second processors; and
a configuration controller configured to identify an operation to be performed by at least one of the first processing circuit or the second processing circuit and cause at least one of the corresponding first hypervisor or second hypervisor to allocate one or more respective first processors or second processors to perform the operation.

2. The digital processing system of claim 1, wherein:
the configuration controller is implemented by the first processing circuit and controls a mode of the second processing circuit based on the operation.

3. The digital processing system of claim 2, wherein the configuration controller operates a bootloader to determine the mode based on software to be operated by the second processing circuit to perform the operation.

4. The digital processing system of claim 1, further comprising a first memory bus coupling the plurality of first processors to a first memory device and a second memory bus physically separated from the first memory bus and coupling the plurality of second processors to a second memory device.

5. The digital processing system of claim 1, wherein the operation is a first operation, and the configuration controller configures the first processing circuit to perform the first operation while the second processing circuit performs a second operation.

6. The digital processing system of claim 1, wherein the first processing circuit receives the red signal via a first network interface physically separate from a second network interface by which the second processing circuit receives the black signal.

7. The digital processing system of claim 1, wherein the operation comprises a first operation to be performed on the red signal, and the first hypervisor allocates one or more of the first processors to perform the operation while allocating one or more other first processors to perform a second operation that comprises a cryptographic operation.

8. The digital processing system of claim 1, wherein the configuration controller identifies the operation to include at least one of a modulation-demodulation (modem) operation, a control operation, a cryptographic operation, or an application processing operation.

9. The digital processing system of claim 1, wherein at least one of the first processing circuit or the second processing circuit is configured to use memory that is coupled with a battery.

10. The digital processing system of claim 1, further comprising a first clock that sets a first clock speed of the first processing circuit and a second clock that sets a second clock speed of the second processing circuit, wherein the configuration controller determines the first clock speed to be a first value and the second clock speed to be a second value, the first value greater than the second value responsive to the first processing circuit performing a higher intensity operation than the second processing circuit.

11. The digital processing system of claim 1, wherein the first processing circuit and the second processing circuit are each implemented using a system on a chip (SoC).

12. The digital processing system of claim 1, wherein the configuration controller switches the second processing circuit to a low power or off state based on the operation.

13. The digital processing system of claim 1, wherein the configuration controller uses at least one of the first hypervisor or the second hypervisor to cause secret and non-secret operations to be performed separately.

14. A method, comprising:
receiving, by a first programmable logical controller (PLC) of a first processing circuit, a red signal;
receiving, by a second PLC of a second processing circuit physically separated from the first processing circuit, a black signal;
identifying, by a configuration controller, an operation to be performed by at least one of the first processing circuit or the second processing circuit; and
causing, by the configuration controller, at least one of a first hypervisor that controls operation of a plurality of first processors of the first processing circuit or a second hypervisor that controls operation of a plurality of second processors of the second processing circuit to allocate one or more respective first processors or second processors to perform the operation.

15. The method of claim 14, further comprising:
determining, by the configuration controller, a mode corresponding to the operation; and
controlling, by the configuration controller, the second processing circuit based on the mode.

16. The method of claim 15, further comprising:
identifying, by a bootloader, the mode based on software to be operated by the second processing circuit.

17. The method of claim 15, wherein the operation is a first operation, the method further comprising performing, by the first processing circuit, the first operation on the red signal while performing, by the second processing circuit, a second operation on the black signal.

18. The method of claim 15, wherein the operation comprises a first operation to be performed on the red signal, the method further comprising using the first hypervisor to separately allocate first processors to perform the first operation while performing a second operation that comprises a cryptographic operation.

19. The method of claim 15, further comprising:
identifying, by the configuration controller, the operation to include at least one of a modulation-demodulation (modem) operation, a control operation, a cryptographic operation, or an application processing operation;
setting, by a first clock, a first clock speed based on which the first processing circuit operates;
setting, by a second clock, a second clock speed of the second processing circuit based on which the second processing circuit operates; and
determining, by the configuration controller, the first clock speed to be a first value and the second clock speed to be a second value, the first value greater than the second value responsive to the first processing circuit performing a higher intensity operation than the second processing circuit.

20. A configuration controller for a digital processing system comprising a first programmable logical controller (PLC) configured to receive a red signal, a plurality of first processors operated by the first PLC to process the red signal, a first hypervisor configured to control operation of the plurality of first processors, a second PLC configured to receive a black signal, a plurality of second processors operated by the second PLC to process the black signal, and a second hypervisor configured to control operation of the plurality of second processors, the configuration controller comprising:
 instructions stored in a memory wherein the instructions are to identify an operation to be performed by at least one of the first processing circuit or the second processing circuit and cause at least one of the corresponding first hypervisor or second hypervisor to allocate one or more respective first processors or second processors to perform the operation.

* * * * *